US010678733B2

(12) United States Patent
Osqueizadeh (10) Patent No.: US 10,678,733 B2
(45) Date of Patent: Jun. 9, 2020

(54) APPARATUS FOR CONNECTING NON-VOLATILE MEMORY LOCALLY TO A GPU THROUGH A LOCAL SWITCH

(71) Applicant: ATI Technologies ULC, Markham (CA)

(72) Inventor: Nima Osqueizadeh, Markham (CA)

(73) Assignee: ATI Technologies ULC, Markham, Ontario (CA)

( * ) Notice: Subject to any disclaimer, the term of this patent is extended or adjusted under 35 U.S.C. 154(b) by 0 days.

(21) Appl. No.: 16/380,005

(22) Filed: Apr. 10, 2019

(65) Prior Publication Data
US 2019/0243791 A1    Aug. 8, 2019

Related U.S. Application Data

(63) Continuation of application No. 15/389,747, filed on Dec. 23, 2016, now Pat. No. 10,268,620.

(51) Int. Cl.
*G06F 3/00* (2006.01)
*G06F 13/38* (2006.01)
*G06F 13/40* (2006.01)
*G06F 13/16* (2006.01)

(52) U.S. Cl.
CPC ......... *G06F 13/4022* (2013.01); *G06F 13/16* (2013.01); *G06F 13/4068* (2013.01)

(58) Field of Classification Search
CPC ............. G06F 3/00; G06F 13/38; G06F 13/40
See application file for complete search history.

(56) References Cited

U.S. PATENT DOCUMENTS

| 5,968,143 | A | 10/1999 | Chisholm et al. |
| 8,996,781 | B2 | 3/2015 | Schuette et al. |
| 2008/0034149 | A1* | 2/2008 | Sheen ................. G06F 13/1668 711/100 |
| 2008/0162811 | A1* | 7/2008 | Steinmetz ........... G06F 13/4234 711/114 |
| 2009/0313430 | A1* | 12/2009 | Jones ..................... G16H 40/63 711/114 |
| 2015/0212752 | A1* | 7/2015 | Nemazie ............... G06F 3/0688 711/103 |
| 2016/0246521 | A1* | 8/2016 | Dewitt .................... G06F 3/061 |
| 2016/0364829 | A1 | 12/2016 | Apodaca et al. |
| 2018/0165038 | A1* | 6/2018 | Authement .......... G06F 3/0659 |

\* cited by examiner

*Primary Examiner* — David E Martinez
(74) *Attorney, Agent, or Firm* — Volpe and Koenig, P.C.

(57) ABSTRACT

Described herein are a method and device for transferring data in a computer system. The device includes a host processor, a plurality of first memory architectures, a switch, a redundant array of independent drives (RAID) assist unit; and a second memory architecture. The host processor is configured to send a data transfer command to the RAID assist unit via the switch. The RAID assist unit is configured to create a set of parallel memory transactions between the plurality of first memory architectures and the second memory architecture, execute the set of parallel memory transactions via the local switch and absent interaction with the host processor; and notify the host processor upon completion of data transfer. In an implementation, the plurality of first memory architectures is non-volatile memories (NVMs) and the second memory architecture is local memory.

10 Claims, 13 Drawing Sheets

APPARATUS FOR CONNECTING NON-VOLATILE MEMORY LOCALLY TO A GPU THROUGH A LOCAL SWITCH

CROSS-RELATED APPLICATIONS

This application is a continuation of U.S. patent application Ser. No. 15/389,747, filed Dec. 23, 2016, which is related to co-pending application entitled "Method and Apparatus for Connecting Direct Access From Non-volatile Memory to Local Memory, U.S. patent application Ser. No. 15/389,596, filed on Dec. 23, 2016, and to co-pending application entitled "Method and Apparatus for Accessing Non-volatile Memory As Byte Addressable Memory", U.S. patent application Ser. No. 15/389,811, filed on Dec. 23, 2016, and to co-pending application entitled "Method and Apparatus for Integration of Non-volatile Memory", U.S. patent application Ser. No. 15/389,908, filed on Dec. 23, 2016, which are incorporated by reference as if fully set forth.

BACKGROUND

Graphics cards require interaction with a root complex of a host computing system to execute certain types of functions. For example, the transfer of data from non-volatile memory (NVM) to a graphics processing unit (GPU) local memory requires that the data is transferred from the NVM to a host memory, and then from the host memory to the local memory. This involves at least using a root complex of the host computing system. This taxes the root complex and increases traffic and congestion.

BRIEF DESCRIPTION OF THE DRAWINGS

A more detailed understanding may be had from the following description, given by way of example in conjunction with the accompanying drawings wherein.

DETAILED DESCRIPTION

Described herein are apparatus for connecting a first memory architecture to a graphics processing unit (GPU) through a local switch, where the first memory architecture can be a non-volatile memory (NVM) or other similarly used memories, for example, along with associated controllers. The apparatus includes the GPU(s) or discrete GPU(s) (dGPU(s)) (collectively GPU(s)), second memory architectures associated with the GPU(s), the local switch, first memory architecture(s), first memory architecture controllers or first memory architecture connector(s). In an implementation, the local switch is part of the GPU. The apparatus can also include a controller for distributing a large transaction among multiple first memory architectures. In an implementation, the first memory architectures can be directly connected to the GPU. In an implementation, the apparatus is user configurable. In an implementation, the apparatus is a solid state graphics (SSG) card. The second memory architecture can be a local memory, a high bandwidth memory (HBM), a double data rate fourth-generation synchronous dynamic random-access memory (DDR4), a double data rate type five synchronous graphics random access memory (GDDR5), a hybrid memory cube or other similarly used memories, for example, along with associated controllers. For purposes of illustration and discussion, the terms NVM and local memory will be used in the description without limiting the scope of the specification and claims.

Figure 1:
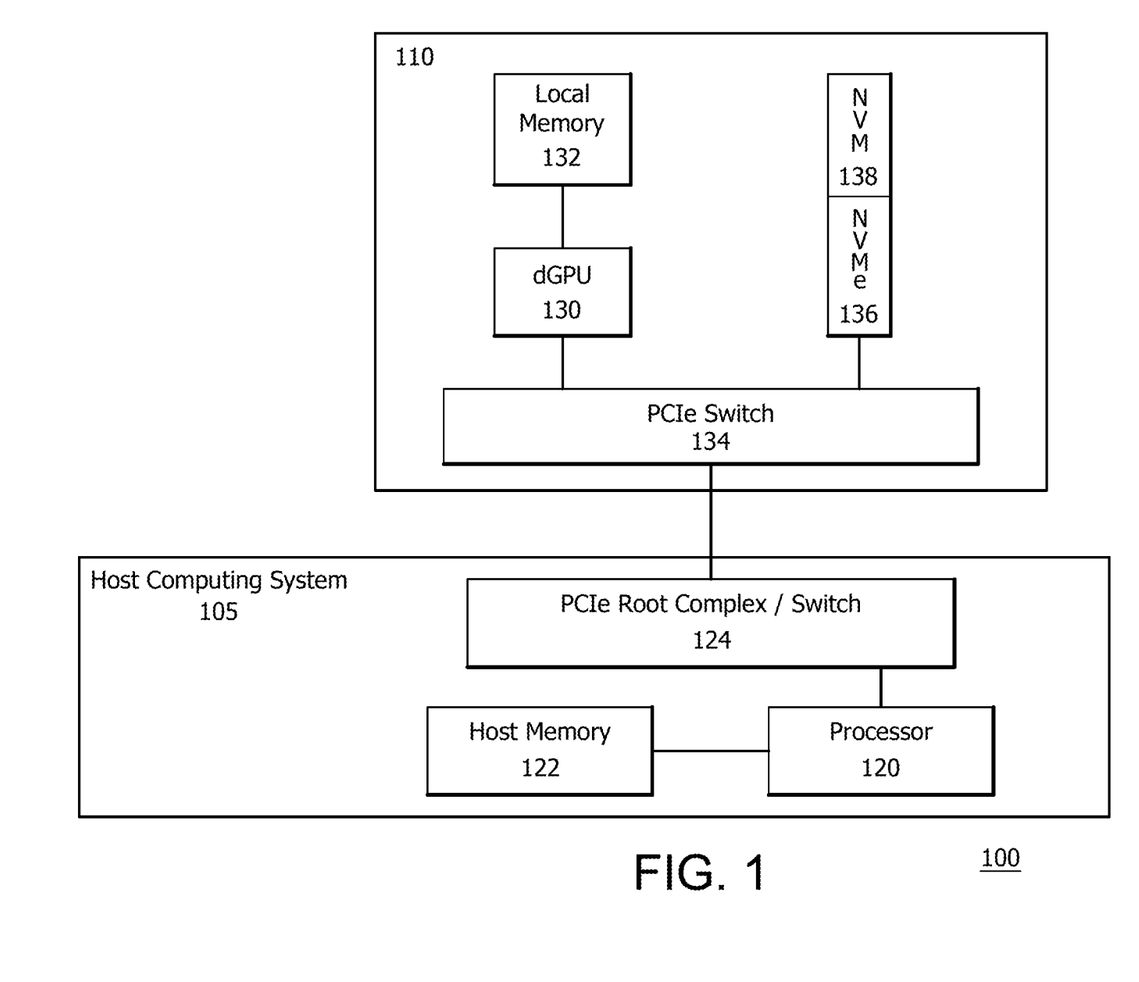
FIG. 1 is a processing system with a host computing system and a solid state graphics (SSG) card in accordance with certain implementations.

FIG. 1 shows an example processing system 100 in accordance with certain implementations. The processing system 100 can include a host computing system 105 that is connected to one or more SSG cards 110. The host computing system 105 includes a processor 120, such as for example a central processing unit (CPU), which may be connected to or in communication with (collectively "connected to") to a host memory 122, such as for example random access memory (RAM). The processor 120 can include an operating system (OS), a device driver and other nominal elements. The processor 120 can also be connected to a number of components that are known to one of ordinary skill in the art. The components may be connected to processor 120 using, for example, a high-speed serial computer expansion bus, such as but not limited to, a Peripheral Component Interconnect Express (PCIe) root complex and switch (collectively PCIe switch) 124. The PCIe switch 124 is shown for purposes of illustration and other electrical or communication interfaces may be used.

In general, SSG card 110 includes a PCIe switch 134 for interfacing with PCIe switch 124. PCIe switch 134 can be connected to one or more non-volatile memory (NVM) controllers 136, such as for example, a NVM Express (NVMe) or Non-Volatile Memory Host Controller Interface Specification (NVMHCI) device, for accessing associated NVMs 138 and one or more dGPUs 130. Each dGPU 130 is further connected to an associated local memory 132. Each NVM controller 136 can manage and access an associated NVM 138 and in particular, can decode incoming commands from host computing system 105 or dGPU 130. In an implementation, SSG card 110 is user reconfigurable. Illustrative configurations for SSG card 110 are described in FIGS. 3-10. Although the figures show a dGPU, any GPU can be used without departing from the scope of the specification or claims. These configurations are illustrative and other configurations can be implemented within the scope of the description and claims.

Inclusion of PCIe switch 134 in SSG card 110 enables peer-to-peer connectivity that bypasses PCIe switch 124. For example, when dGPU 130 executes commands that require data transfer between local memory and one or more NVMs $135_1$ to $135_k$, then the processor 120 can instruct or enable direct data transfer from the associated local memory to one or more NVMs $135_1$ to $135_k$ (arrow 140) or from one or more NVMs $135_1$ to $135_k$ to the associated local memory (arrow 142). The direct data transfer can be initiated by an appropriate NVM controller $134_1$ to $134_k$ via a local PCIe switch, such as for example, PCIe switch $136_1$ to $136_n$. In an implementation, the dGPU can have a hardware agent that can instruct the direct data transfer. This peer-to-peer data transfer or access can alleviate the disadvantages discussed herein. As shown in FIG. 1, this process uses a single hop data transfer process, from local memory $132_1$ to $132_m$ to NVM $135_1$ to $135_k$. That is, the data transfer can be executed locally with respect to the dGPU without involvement of processor 120 or PCIe root complex/switch 128 during execution of the data transfer. Moreover, since data transfer to and from local memory $132_1$ to $132_m$ is initiated by an appropriate NVM controller $134_1$ to $134_k$. This may increase the efficiency of processor 120 as it is not involved in the actual transfer of the data, increase the efficiency of dGPU $130_1$ to $130_m$ as it is not using resources, such as for example memory management resources for initiating and executing the data transfer, decrease system latency and increase system performance.

Figure 2:
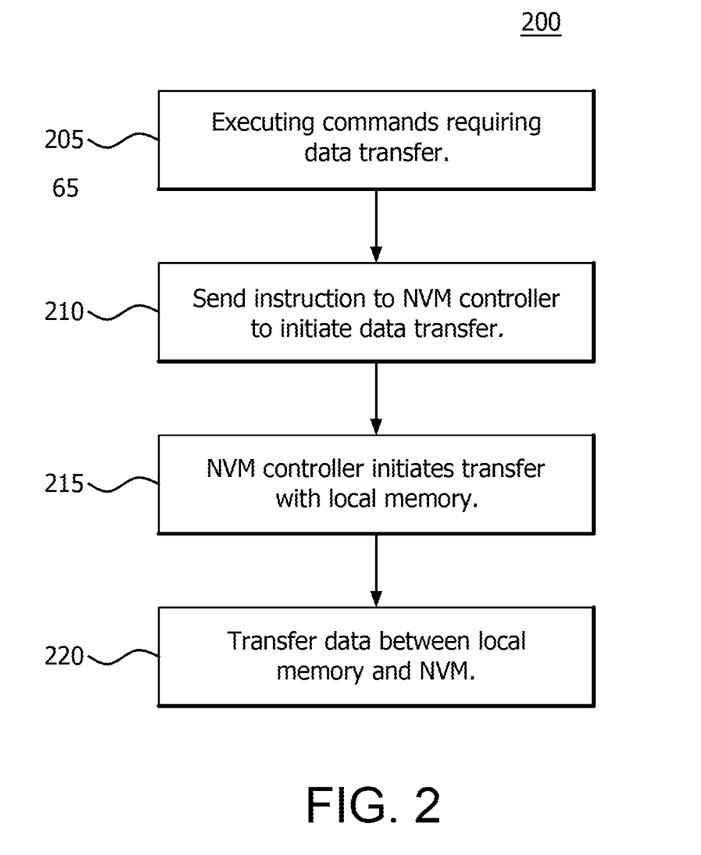
FIG. 2 is a flow chart using an SSG card in accordance with certain implementations.

FIG. 2, in concert with FIG. 1, shows an example flowchart 200 for transferring data directly between local memory $132_1$ to $132_m$ and one or more NVMs $135_1$ to $135_k$. As commands are executed by one or more dGPUs $130_1$ to $130_m$, certain commands may need access between to one or more NVMs $135_1$ to $135_k$ (step 205). A data transfer command is sent by a processor 120 or hardware agents in one or more dGPUs $130_1$ to $130_m$ to appropriate NVM controllers $134_1$ to $134_k$ (step 210). The appropriate NVM controller $134_1$ to $134_k$ initiates the data transfer (step 215). The data is transferred between local memory $132_1$ to $132_m$ and one or more NVMs $135_1$ to $135_k$ via a local PCIe switch $136_1$ to $136_n$, as appropriate (step 220).

Figure 3:
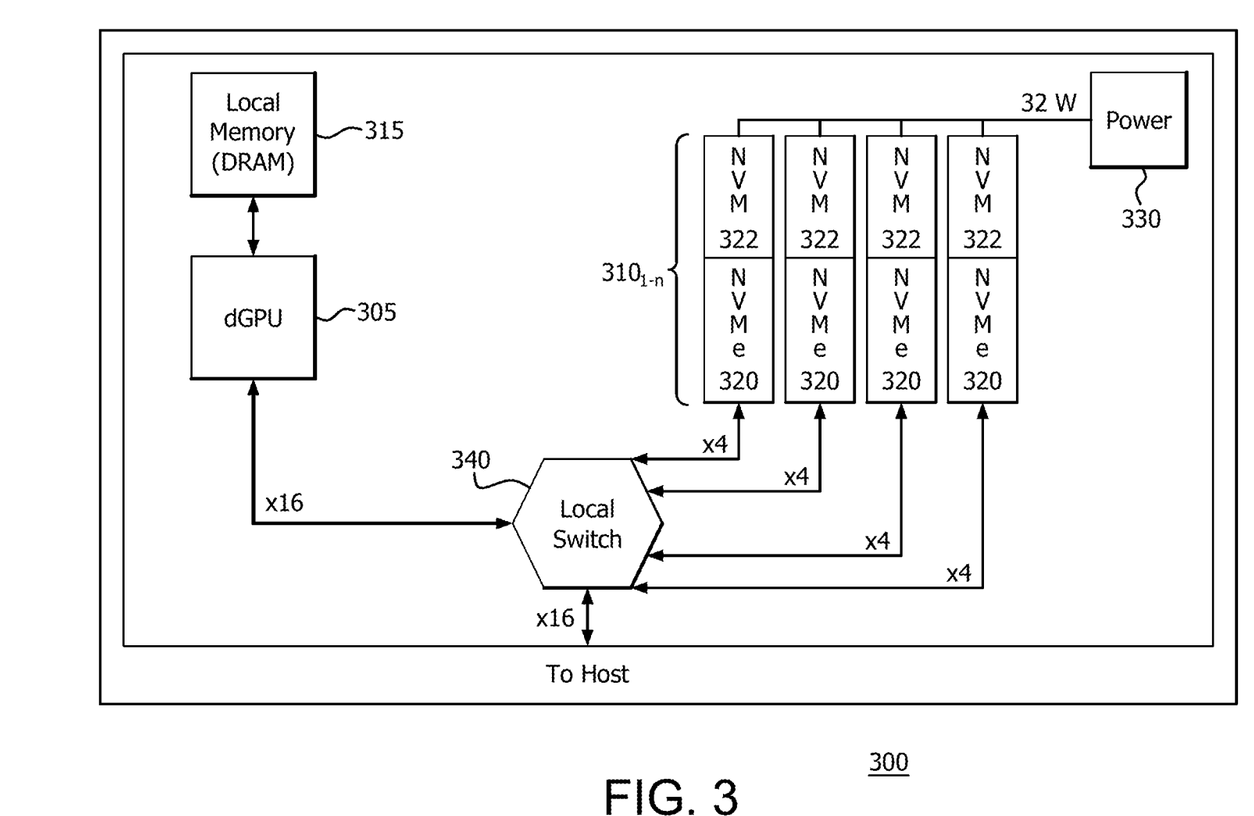
FIG. 3 is an SSG card with a graphics processing unit (GPU) and multiple non-volatile memory (NVM) units in accordance with certain implementations.

FIG. 3 illustrates an SSG card 300 with a dGPU 305 and NVM units $310_{1-n}$ in accordance with certain implementations. dGPU 305 is connected to a local memory 315. Each NVM unit $310_{1-n}$ includes a NVM controller, such as NVMe 320, which is connected to a NVM 322. In an implementation, each NVM unit $310_{1-n}$ is powered in-card by a power source 330. SSG card 300 further includes a local switch 340 which is connected to each NVM unit $310_{1-n}$ and dGPU 305. Local switch 340 further connects SSG card 300 to a host, (as shown for example in FIG. 1). In an implementation, local switch 340 can be integrated with dGPU 305. In an implementation, SSG card 300 is user reconfigurable. Operationally, SSG card 300 functions as described herein above with respect to FIGS. 1 and 2 except that multiple NVMs 322 can be accessed.

Figure 4:
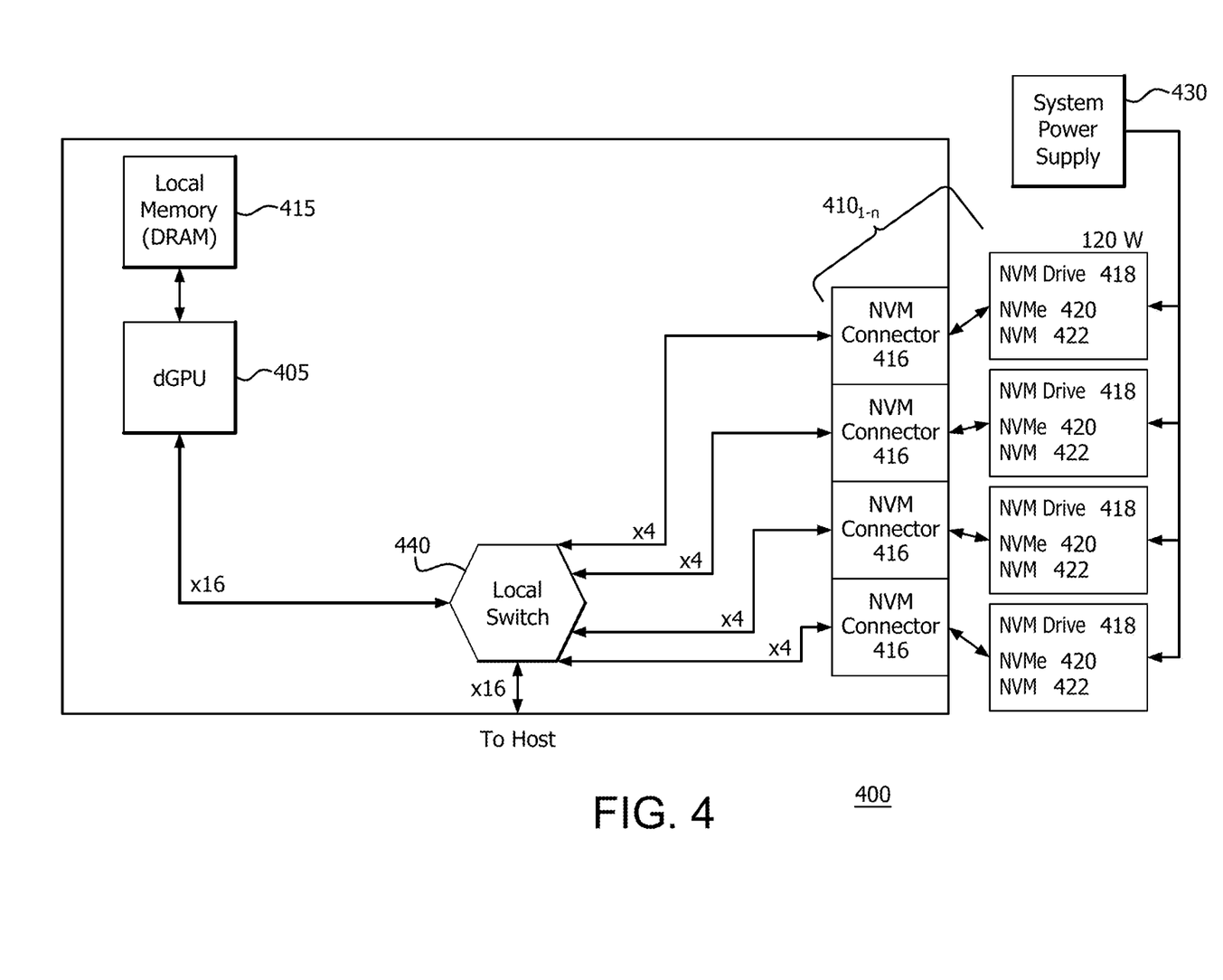
FIG. 4 is another SSG card with a GPU and multiple connectors for NVM units in accordance with certain implementations.

FIG. 4 illustrates an SSG card 400 with a dGPU 405 and multiple NVM units $410_{1-n}$ in accordance with certain implementations. dGPU 405 is connected to a local memory 415. Each NVM unit $410_{1-n}$ includes a NVM connector 416 connected to NVM drive 418. Each NVM connector 416 can be a mini—Serial Attached Small Computer System Interface (SCSI) (mini-SAS) connector or other similar connector types. Each NVM drive 418 includes a NVM controller, such as NVMe 420, which is connected to a NVM 422. In an implementation, each NVM drive 418 is powered by system power supply 430. SSG card 400 further includes a local switch 440 which is connected to each NVM connector 416 and dGPU 405. Local switch 440 further connects SSG card 400 to a host, (as shown for example in FIG. 1). In an implementation, local switch 440 can be integrated with dGPU 405. In an implementation, SSG card 400 is user reconfigurable. Operationally, SSG card 400 functions as described herein above with respect to FIGS. 1 and 2 except that multiple NVMs 422 can be accessed but are implemented off-card.

Figure 5:
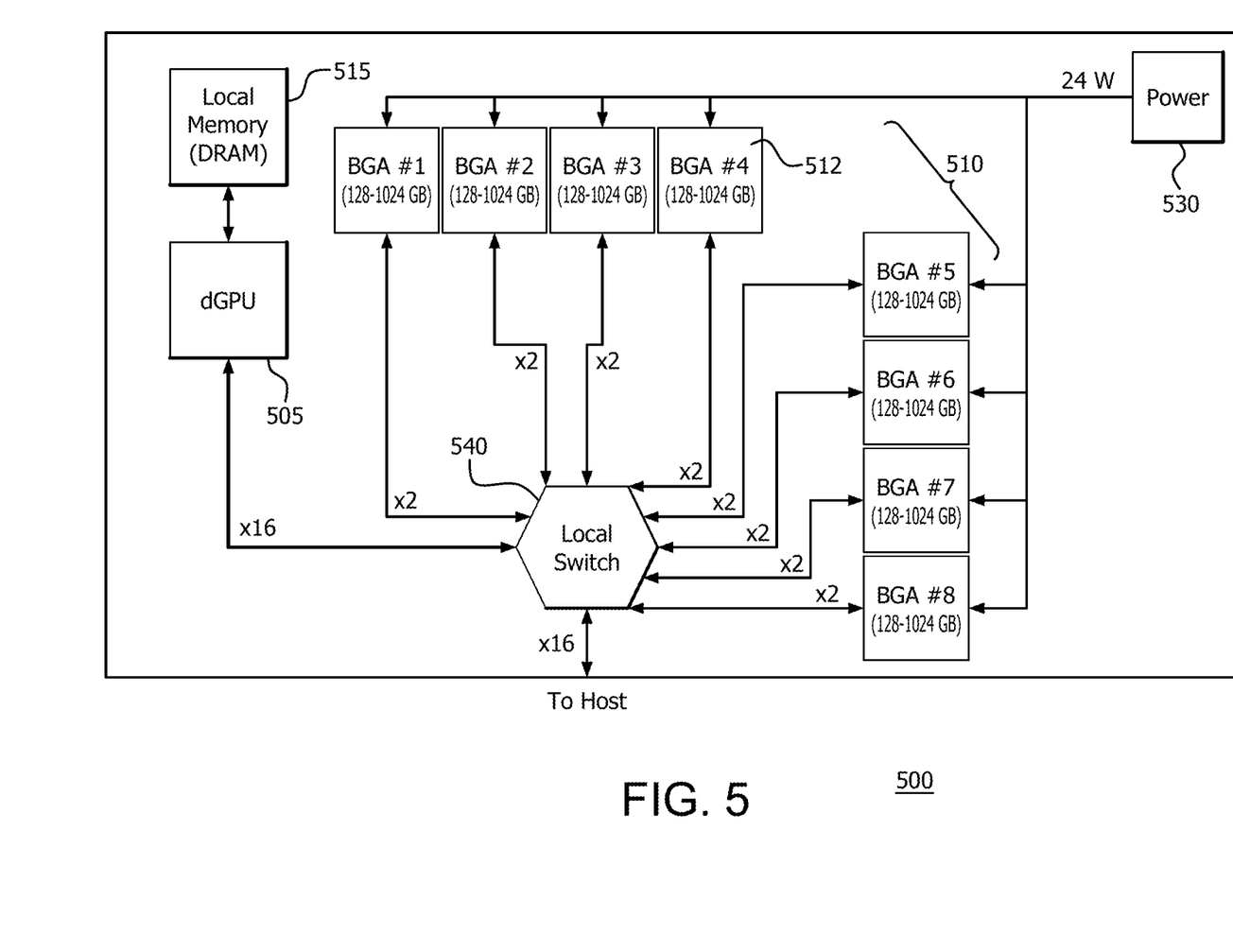
FIG. 5 is another SSG card with a GPU and a ball grid array (BGA) for mounting multiple NVM units in accordance with certain implementations.

FIG. 5 illustrates an SSG card 500 with a dGPU 505 and a ball grid array (BGA) 510 for mounting multiple NVM units in accordance with certain implementations. dGPU 505 is connected to a local memory 515. A NVM unit, which includes a NVM controller connected to a NVM and is shown for example in FIGS. 1, 3 and 4, is mounted to each mounting position 512 in BGA 510. In an implementation, each mounting position 512 connected to in-card power supply 530. SSG card 500 further includes a local switch 540 which is connected to each mounting position 512 of BGA 510 and to dGPU 505. Local switch 540 further connects SSG card 500 to a host, (as shown for example in FIG. 1). In an implementation, local switch 540 can be integrated with dGPU 505. Operationally, SSG card 500 functions as described herein above with respect to FIGS. 3 and 4 except that multiple NVMs are mounted to BGA 510.

Figure 6:
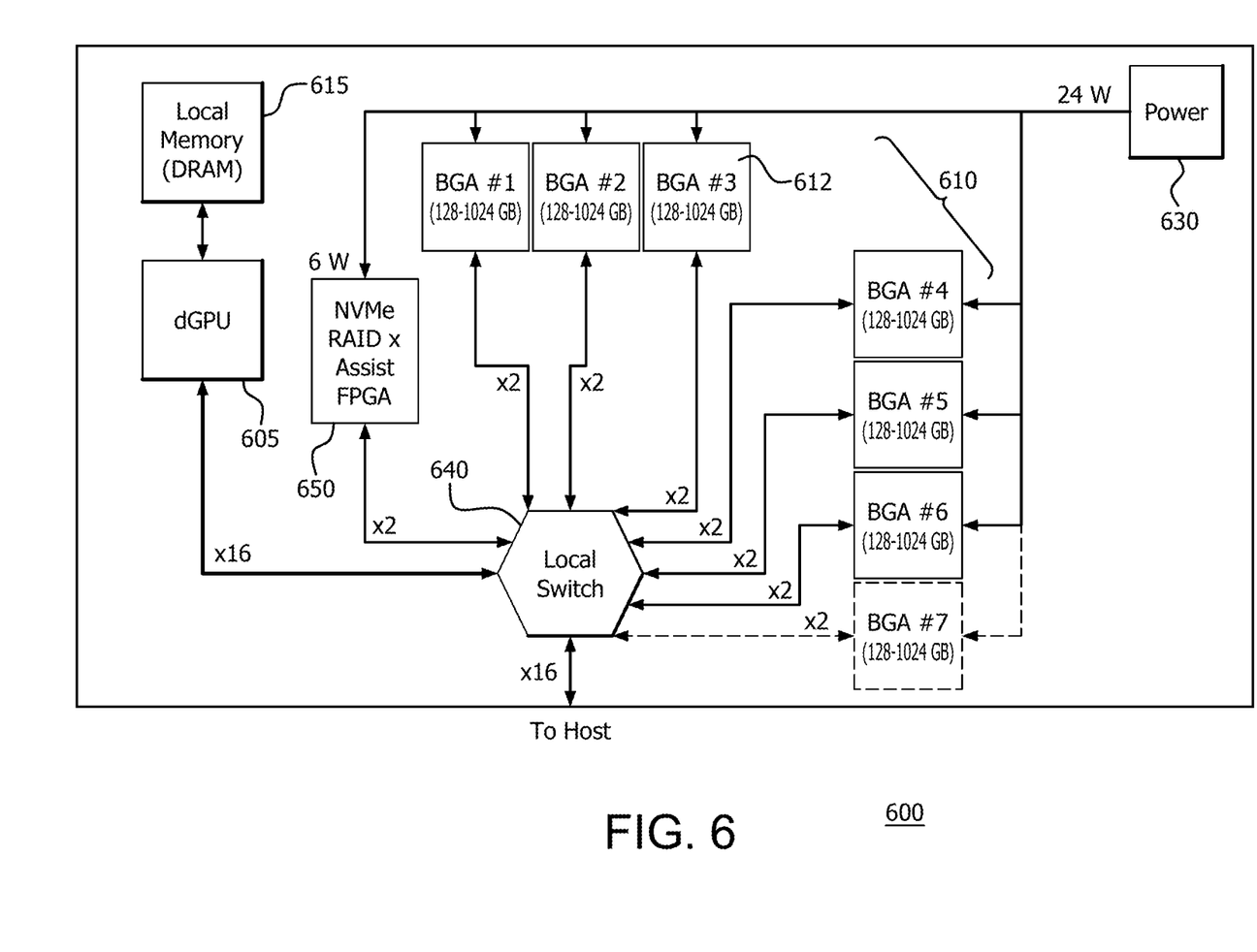
FIG. 6 is another SSG card with a GPU, a ball grid array (BGA) for mounting multiple NVM units and a redundant array of independent disks (RAID) assist in accordance with certain implementations.

FIG. 6 illustrates an SSG card 600 with a dGPU 605, a ball grid array (BGA) 610 for mounting multiple NVM units and a redundant array of independent disks (RAID) assist 650 in accordance with certain implementations. dGPU 605 is connected to a local memory 615. A NVM unit, which includes a NVM controller connected to a NVM and is shown for example in FIGS. 1, 3 and 4, is mounted to each mounting position 612 of BGA 610. RAID assist 650 is connected to each mounting position 612. In an implementation, each mounting position 612 and RAID assist 650 is connected to in-card power supply 630. SSG card 600 further includes a local switch 640 which is connected to each mounting position 612 of BGA 610, dGPU 605 and RAID assist 650. Local switch 640 further connects SSG card 600 to a host, (as shown for example in FIG. 1). In an implementation, local switch 640 can be integrated with dGPU 605. Operationally, SSG card 600 functions as described herein above with respect to FIG. 5 except that RAID assist 650 distributes transactions or operations across one or more of the NVM units mounted to mounting positions 612 of BGA 610. This operation is further described herein with respect to FIGS. 11 and 12.

Figure 7:
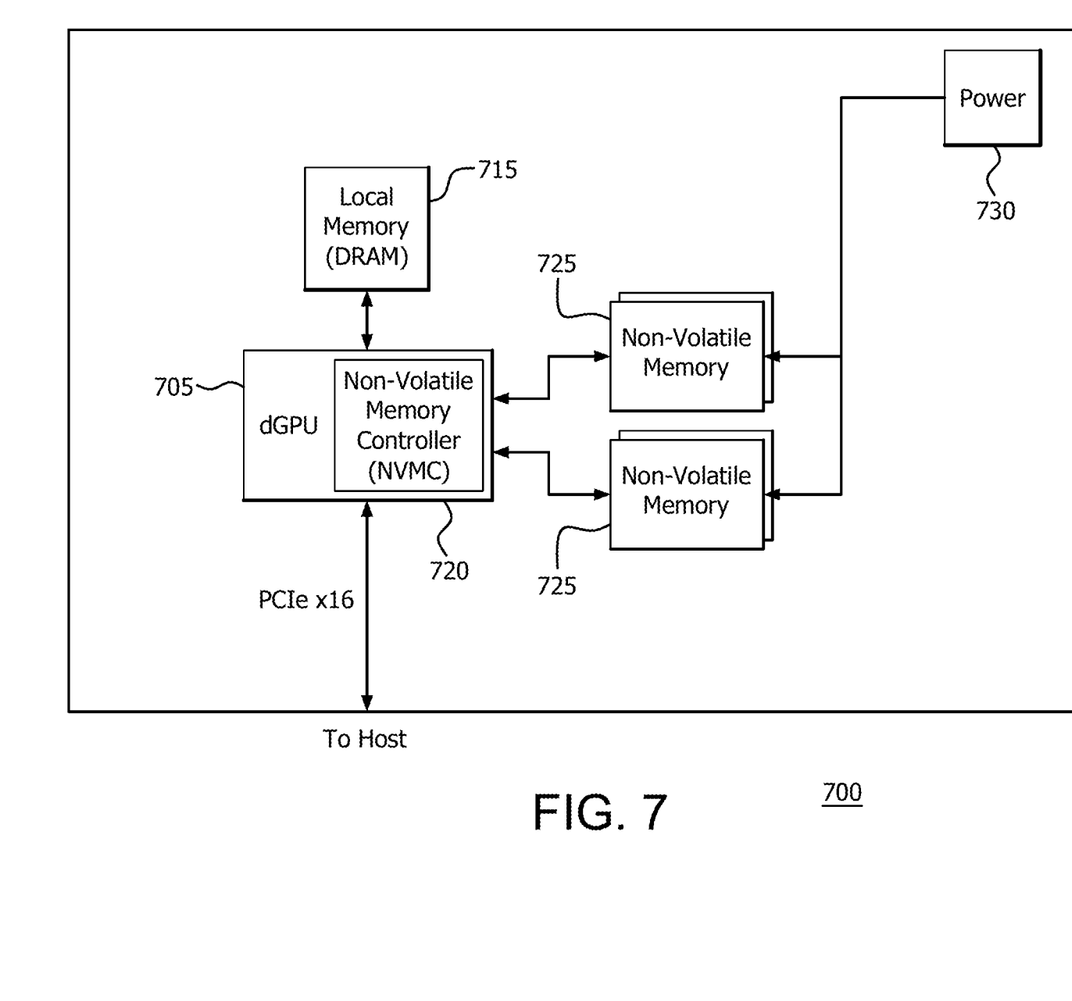
FIG. 7 is another SSG card with a GPU having an integrated NVM controller in accordance with certain implementations.

FIG. 7 illustrates an SSG card 700 with a dGPU 705 having an integrated NVM controller 720 in accordance with certain implementations. dGPU 705 is connected to a local memory 715. In an implementation, dGPU 705 includes an integrated local switch. SSG card 700 includes one or more NVMs 725, which are connected to integrated NVM controller 720 via a multichannel direct interface. In an implementation, each NVM 725 is connected to in-card power supply 730. Operationally, SSG card 700 functions as described herein above with respect to FIGS. 1 and 2 except that dGPU 705 directly controls NVMs 725.

Figure 8:
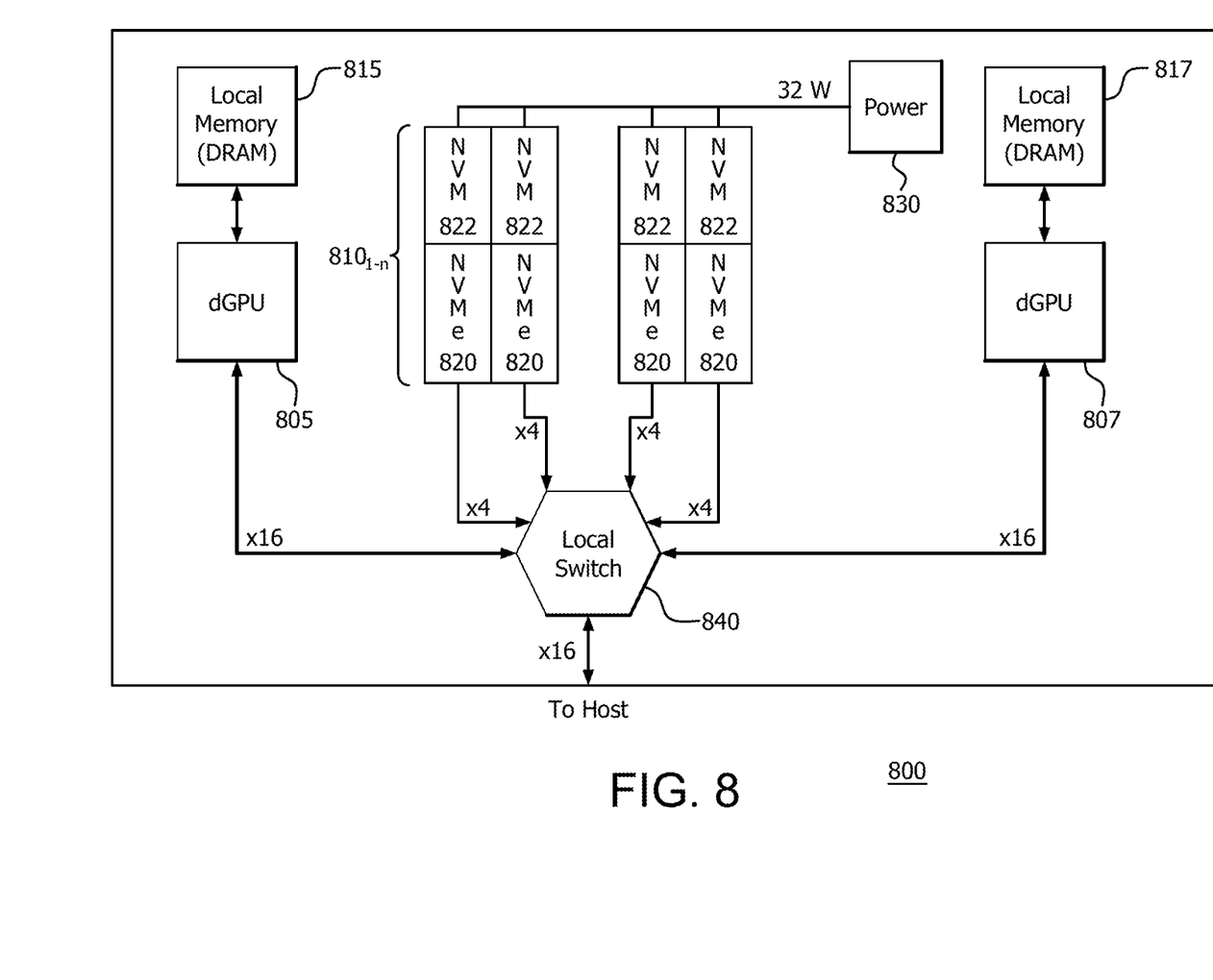
FIG. 8 is another SSG card with multiple GPUs and multiple NVM units in accordance with certain implementations.

FIG. 8 illustrates an SSG 800 card with multiple dGPUs 805 and 807 and multiple NVM units $810_{1-n}$ in accordance with certain implementations. Each dGPU 805 and 807 are connected to a local memory 815 and 817, respectively. Each NVM unit $810_{1-n}$ includes a NVM controller, such as NVMe 820, which is connected to a NVM 822. In an implementation, each NVM unit $810_{1-n}$ is powered in-card by a power source 830. SSG card 800 further includes a local switch 840 which is connected to each NVM unit $810_{1-n}$ and dGPUs 805 and 807. Local switch 840 further connects SSG card 800 to a host, (as shown for example in FIG. 1). In an implementation, local switch 840 can be integrated with one of dGPU 805 or 807. In an implementation, SSG card 800 is user reconfigurable. Operationally, SSG card 800 functions as described herein above with respect to FIG. 3 except that multiple dGPUs 805 and 807 can access multiple NVM units $810_{1-n}$.

Figure 9:
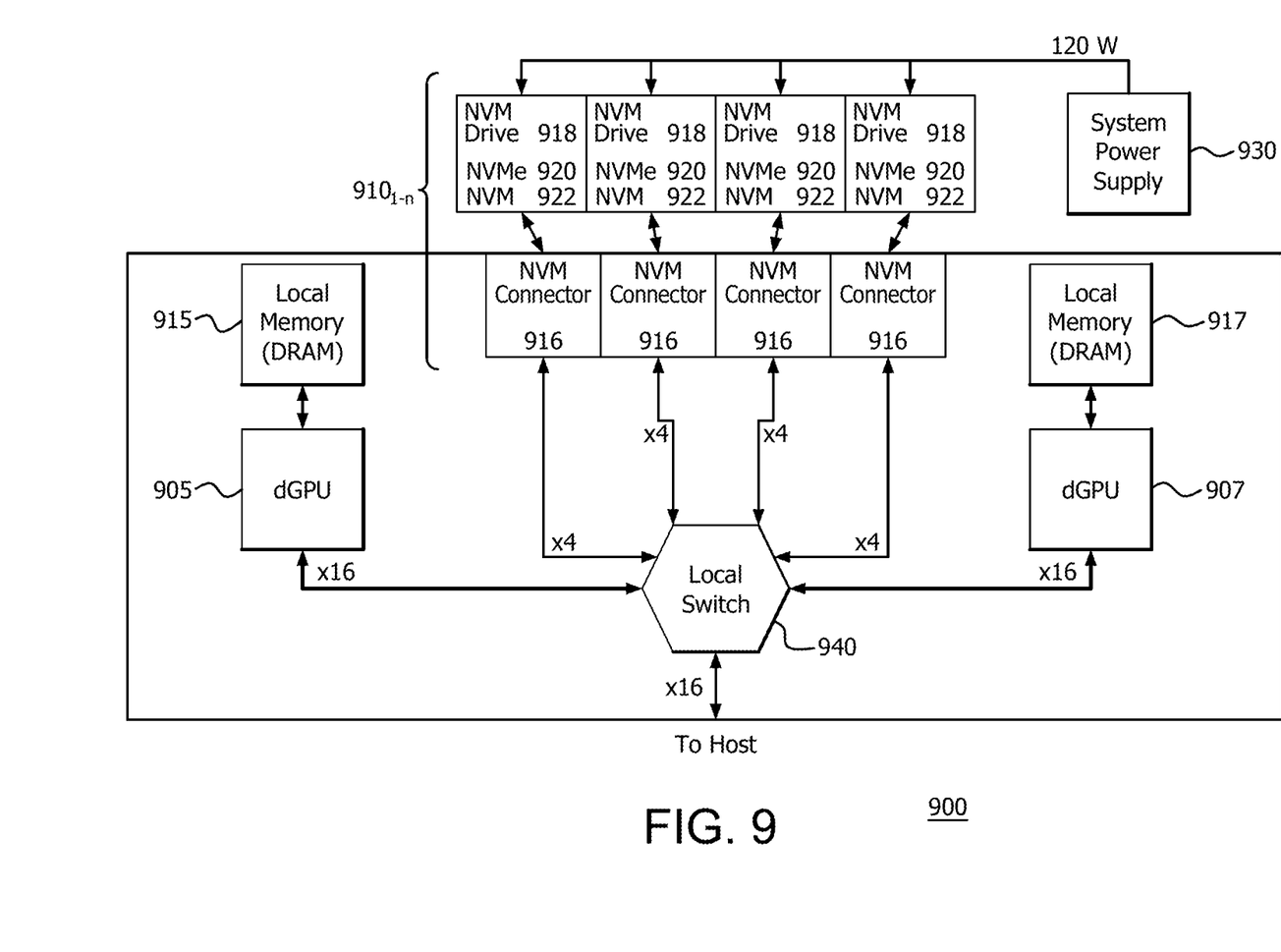
FIG. 9 is another SSG card with multiple GPUs and multiple connectors for NVM units in accordance with certain implementations.

FIG. 9 illustrates SSG card 900 with multiple dGPUs 905 and 907 and multiple NVM units $910_{1-n}$ in accordance with certain implementations. Each dGPU 905 and 907 is connected to a local memory 915 and 917. Each NVM unit $410_{1-n}$ includes a NVM connector 916 connected to NVM drive 918. Each NVM connector 916 can be a mini-SAS connector or other similar connector types. Each NVM drive 918 includes a NVM controller, such as NVMe 920, which is connected to a NVM 922. In an implementation, each NVM drive 918 is powered by system power supply 930. SSG card 900 further includes a local switch 940 which is connected to each NVM connector 916 and dGPUs 905 and 907. Local switch 940 further connects SSG card 900 to a host, (as shown for example in FIG. 1). In an implementation, local switch 940 can be integrated with dGPU 905 or 907. In an implementation, SSG card 900 is user reconfigurable. Operationally, SSG card 900 functions as described herein above with respect to FIG. 4 except that multiple dGPUs 905 and 907 can access NVMs 922 which are implemented off-card.

Figure 10:
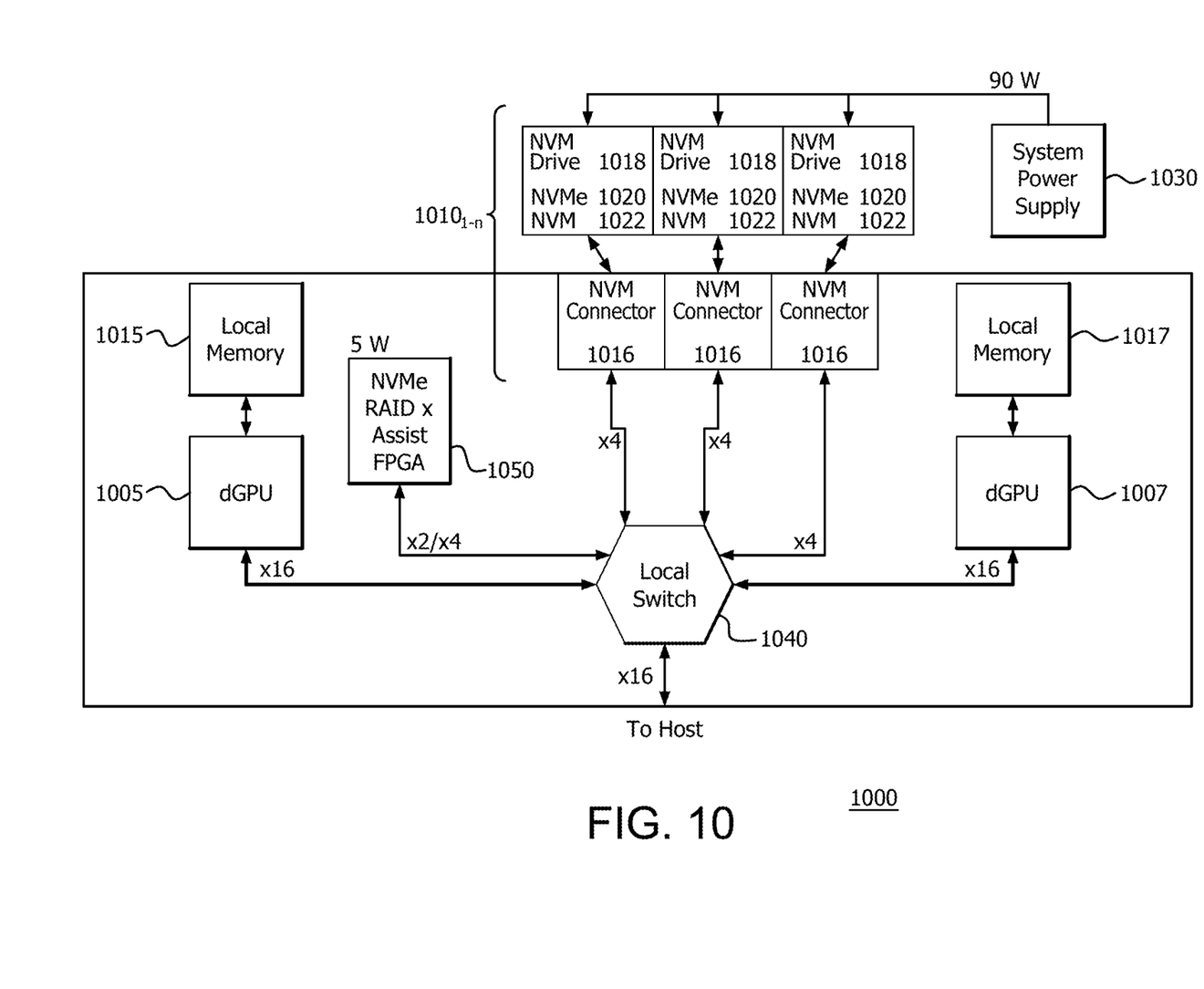
FIG. 10 is another SSG card with multiple GPUs, a RAID assist and multiple connectors for NVM units in accordance with certain implementations.

FIG. 10 illustrates SSG card 1000 with multiple dGPUs 1005 and 1007, a RAID assist and multiple NVM units $1010_{1-n}$ in accordance with certain implementations. Each dGPU 1005 and 1007 is connected to a local memory 1015 and 1017. Each NVM unit $1010_{1-n}$ includes a NVM connector 1016 connected to NVM drive 1018. Each NVM connector 1016 can be a mini-SAS connector or other similar connector types. Each NVM drive 1018 includes a NVM controller, such as NVMe 1020, which is connected to a NVM 1022. In an implementation, each NVM drive 1018 is powered by system power supply 1030. SSG card 1000 further includes a local switch 1040 which is connected to each NVM connector 1016, dGPUs 1005 and 1007 and RAID assist 1050. Local switch 1040 further connects SSG card 1000 to a host, (as shown for example in FIG. 1). In an implementation, local switch 1040 can be integrated with dGPU 1005 or 1007. In an implementation, SSG card 900 is user reconfigurable. Operationally, SSG card 900 functions as described herein above with respect to FIG. 6 except that multiple dGPUs 905 and 907 can access NVMs 922 which are implemented off-card. In particular, RAID assist 1050 distributes transactions or operations across one or more of the NVM units $1010_{1-n}$. This operation is further described herein with respect to FIGS. 11 and 12.

Figure 11:
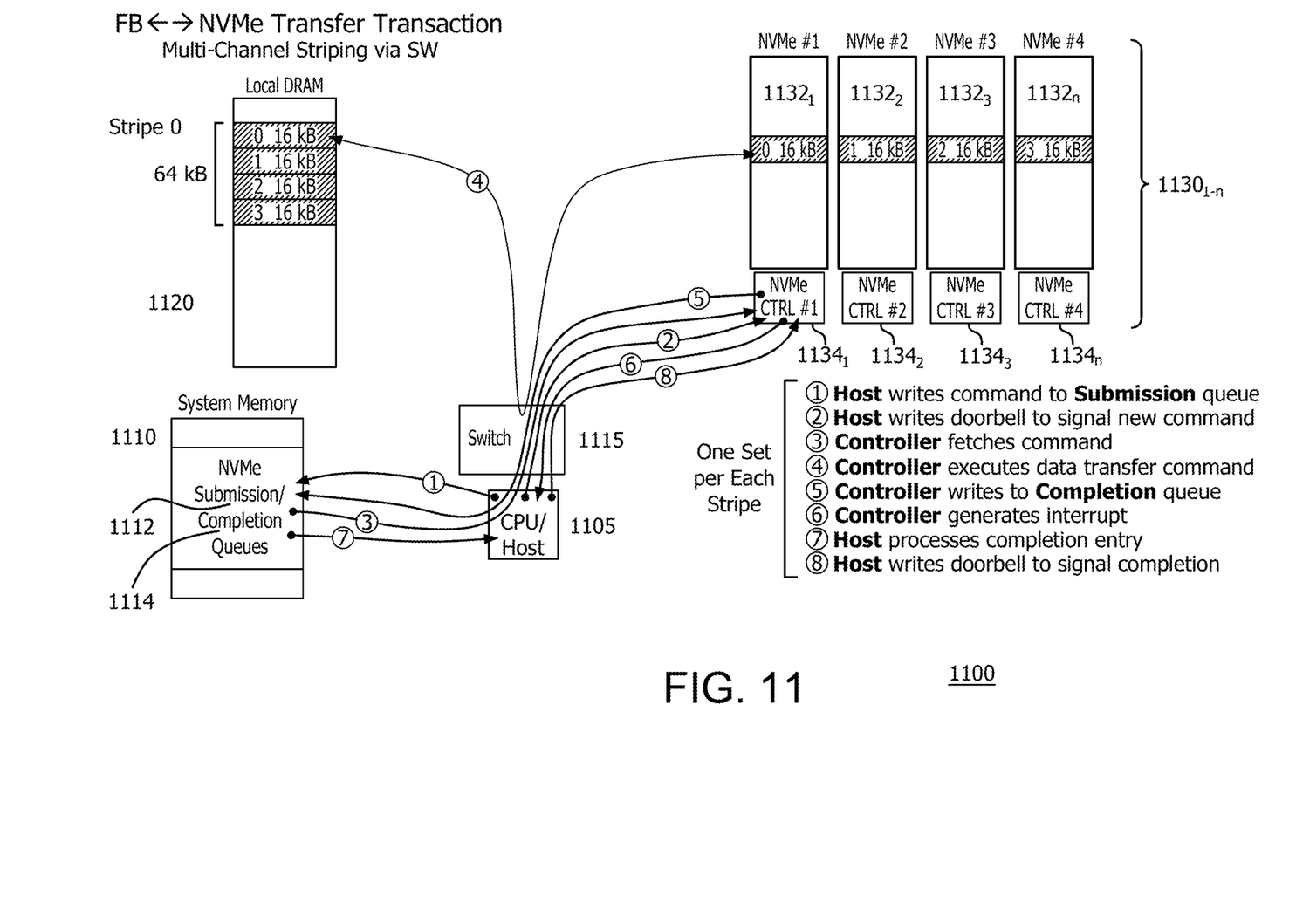
FIG. 11 is a flow diagram for RAID assist processing.

FIG. 11 is a flow diagram 1100 for RAID processing or data striping that does not use the implementations described herein. The flow diagram 1100 shows the interaction between a host processor 1105, (such as a central processing unit (CPU)), system memory 1110, a local switch 1115, a local memory 1120, (local to, for example, a dGPU), and multiple NVM units $1130_{1-n}$ to process a stripe in a NVM. Each NVM unit $1130_{1-n}$ includes a NVM controller $1132_{1-n}$ connected to a NVM $1134_{1-n}$. Although FIG. 11 illustrates that the switch is a local switch 1115, in an implementation, the switch can be a host switch.

Data striping segments logically sequential data, such as a file, so that consecutive segments are stored on different physical storage devices, such as NVMs. These are referred to as stripes. Flow diagram 1100 shows the sequence of steps needed to process a stripe. Operationally, host processor 1105 writes a command, (for example a data transfer command), to a submission queue 1112 in system memory 1110 (step 1) and writes to a doorbell register in, for example, NVM controller $1134_1$ to signal that the data transfer command is available in submission queue 1112 (step 2) to process stripe 0. NVM controller $1134_1$ fetches the data transfer command from submission queue 1112 (step 3) and executes the data transfer command between local memory 1120 and NVM $1132_1$ (step 4). Upon execution of the data transfer command, NVM controller $1134_1$ writes a completion entry in completion queue 1114 in system memory 1110 (step 5) and generates an interrupt for NVM controller $1134_1$ (step 6). Host processor 1105 processes the completion entry (step 7) and writes to the doorbell register in NVM controller $1134_1$ to signal completion (step 8). Steps 1-8 are then repeated for the remaining stripes. As shown, there are multiple interactions between host processor 1105, system memory 1110, host switch 1115, local memory 1120, NVM $1132_{1-n}$ and NVM controller $1134_{1-n}$ for each stripe. This involves at least using a root complex of the host computing system. This taxes the root complex and increases traffic and congestion.

Figure 12:
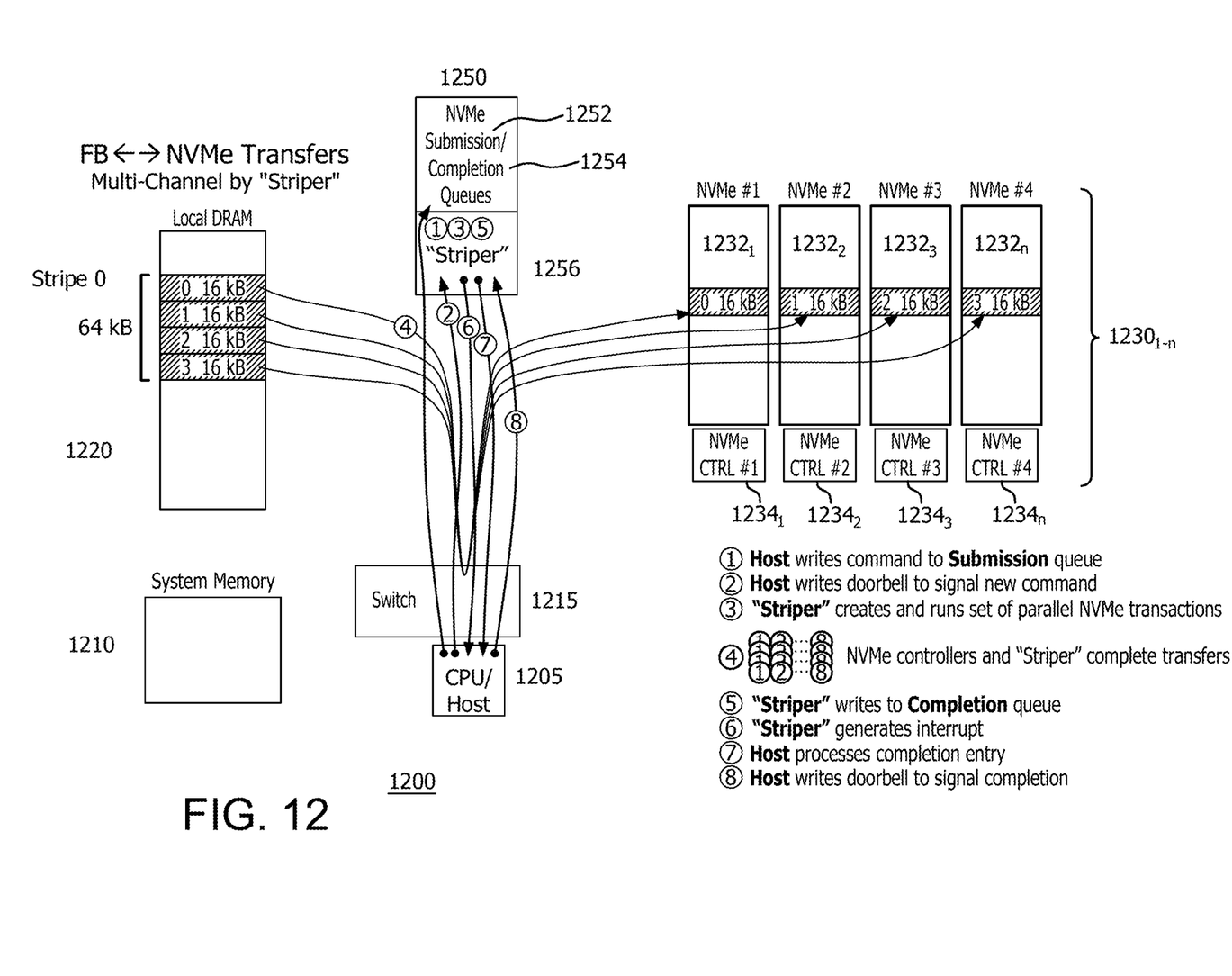
FIG. 12 is a flow diagram for RAID assist processing in accordance with certain implementations.

FIG. 12 is a flow diagram 1200 for RAID assist processing in accordance with certain implementations. Flow diagram 1200 shows the interaction between a host processor 1205, (such as a central processing unit (CPU)), system memory 1210, a local switch 1215, a RAID assist 1250, a local memory 1220, (local to, for example, a dGPU), and multiple NVM units $1230_{1-n}$ to process a stripe in a NVM. Each NVM unit $1230_{1-n}$ includes a NVM controller $1232_{1-n}$ connected to a NVM $1234_{1-n}$. Although FIG. 12 illustrates that the switch is a local switch 1215, in an implementation, the switch can be a host switch.

As noted above, flow diagram 1200 shows the sequence of steps needed to process a stripe. Operationally, host processor 1205 writes a command, (for example a data transfer command), to a submission queue 1252 in RAID assist 1250 (step 1) and writes to a doorbell register in a striper 1256 in RAID assist 1250 to signal that the data transfer command is available in submission queue 1252 (step 2) to process stripe 0. Striper 1256 creates a set of parallel NVM transactions for data transfers between local memory 1220 and NVM $1232_1$-NVM $1232_n$, respectively (step 3). Striper 1256 and NVM controllers $1234_{1-n}$ executes the data transfers without having to interact with system memory 1210 and host memory 1205 (step 4). Upon execution of the data transfer command for all stripes, striper 1256 writes a completion entry in completion queue 1254 in RAID assist 1250 (step 5) and generates an interrupt for host controller 1205 (step 6). Host processor 1205 processes the completion entry (step 7) and writes to the doorbell register in RAID assist 1250 to signal completion (step 8). As shown, RAID assist 1250 minimizes interaction with host processor 1205 and system memory 1210 until data transfer completion. Each of the stripe transactions is essentially transparent to host processor 1205 and system memory 1210

Figure 13:
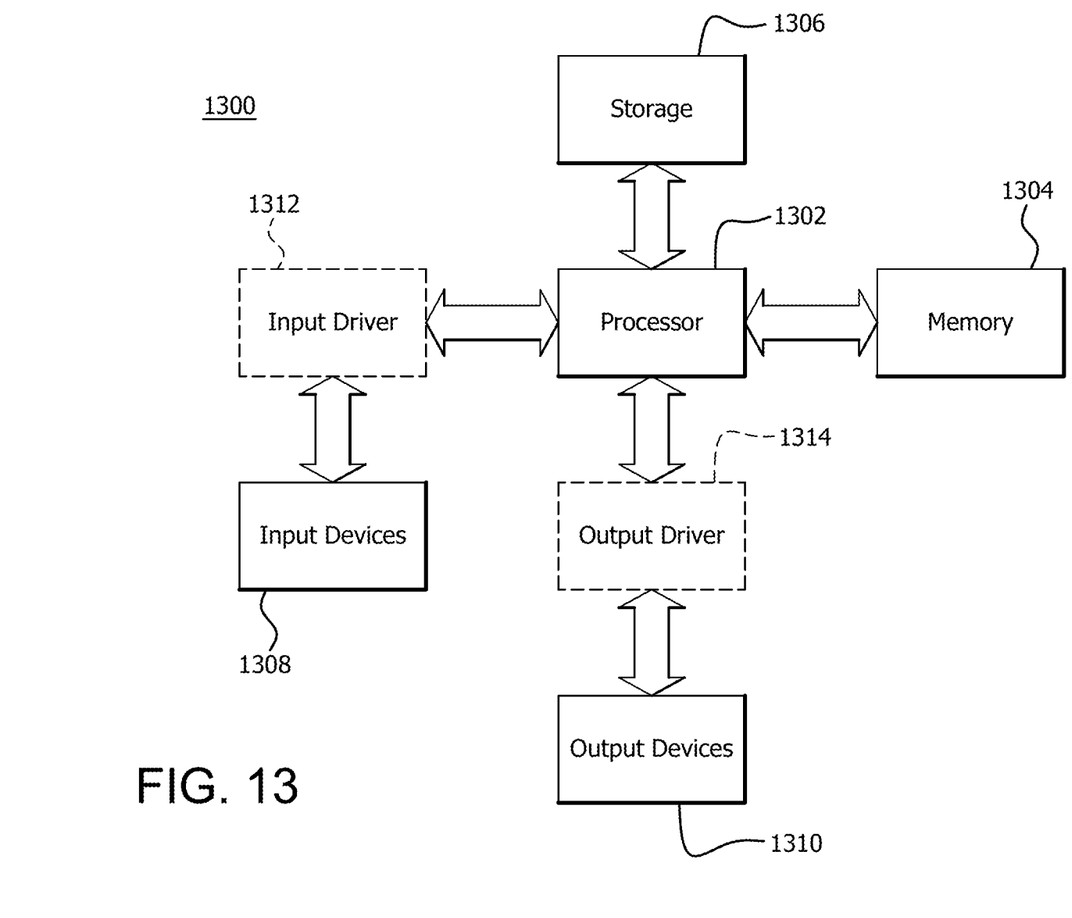
FIG. 13 is a block diagram of an example device in which one or more disclosed implementations may be implemented.

FIG. 13 is a block diagram of an example device 1300 in which one portion of one or more disclosed implementations may be implemented. The device 1300 may include, for example, a head mounted device, a server, a computer, a gaming device, a handheld device, a set-top box, a television, a mobile phone, or a tablet computer. The device 1300 includes a processor 1302, a memory 1304, a storage 1306, one or more input devices 1308, and one or more output devices 1310. The device 1300 may also optionally include an input driver 1312 and an output driver 1314. It is understood that the device 1300 may include additional components not shown in FIG. 13.

The processor 1302 may include a central processing unit (CPU), a graphics processing unit (GPU), a CPU and GPU located on the same die, or one or more processor cores, wherein each processor core may be a CPU or a GPU. The memory 1304 may be located on the same die as the processor 1302, or may be located separately from the processor 1302. The memory 1304 may include a volatile or non-volatile memory, for example, random access memory (RAM), dynamic RAM, or a cache.

The storage 1306 may include a fixed or removable storage, for example, a hard disk drive, a solid state drive, an optical disk, or a flash drive. The input devices 1308 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 310 may include a display, a speaker, a printer, a haptic feedback device, one or more lights, an antenna, or a network connection (e.g., a wireless local area network card for transmission and/or reception of wireless IEEE 802 signals).

The input driver 1312 communicates with the processor 1302 and the input devices 1308, and permits the processor 1302 to receive input from the input devices 1308. The output driver 1314 communicates with the processor 1302 and the output devices 1310, and permits the processor 1302 to send output to the output devices 1310. It is noted that the input driver 1312 and the output driver 1314 are optional components, and that the device 1300 will operate in the same manner if the input driver 1312 and the output driver 1314 are not present.

In general, in an implementation, solid state graphics (SSG) card includes at least one graphics processing unit (GPU), a second memory architecture associated with each GPU, at least one first memory architecture unit and a local switch coupled to each first memory architecture unit and the at least one GPU. A first memory architecture unit and the local switch directly process data transactions between a second memory architecture and the first memory architecture unit in response to a data transfer command. In an implementation, each first memory architecture unit is powered by an in-card power supply. In an implementation, each first memory architecture unit includes a first memory architecture and an associated first memory architecture controller. In an implementation, each first memory architecture unit includes a first memory architecture connector on the SSG card and a first memory architecture drive for connecting to the first memory architecture connector, where each first memory architecture drive includes a first memory architecture and an associated first memory architecture controller. In an implementation, each first memory architecture drive is powered by an off-card power supply. In an implementation, each first memory architecture unit includes a ball grid array (BGA) mount on the SSG card and a first memory architecture drive for connecting to the BGA mount, where each first memory architecture drive includes a first memory architecture and an associated first memory architecture controller. In an implementation, each BGA mount is powered by an in-card power supply. In an implementation, the local switch is integrated with one of the at least one GPU. In an implementation, the at least one first memory architecture unit is a plurality of first memory architecture units and further includes a redundant array of independent drives (RAID) assist unit connected to each of the plurality of first memory architecture units and the local switch, the RAID assist unit segmenting and distributing a data transaction amongst the plurality of first memory architecture units. In an implementation, the at least one first memory architecture unit is a plurality of first memory architecture units and where one set of first memory architecture units have first memory architectures and associated first memory architecture controllers on the SSG card and another set of first memory architecture units have at least one of first memory architectures and associated first memory architecture controllers external to the SSG card.

In an implementation, a solid state graphics (SSG) card includes at least one graphics processing unit (GPU) including a first memory architecture controller, a second memory architecture associated with each GPU and at least one first memory architecture unit connected to the first memory architecture controller. The GPU directly processes data transactions between a second memory architecture and the at least one first memory architecture in response to a data transfer command. In an implementation, each first memory architecture unit is powered by an in-card power supply. In an implementation, each first memory architecture unit includes a first memory architecture connector on the SSG card and a first memory architecture drive for connecting to the first memory architecture connector, where each first memory architecture drive includes a first memory architecture. In an implementation, each first memory architecture drive is powered by an off-card power supply. In an implementation, each first memory architecture unit includes a ball grid array (BGA) mount on the SSG card and a first memory architecture drive for connecting to the BGA mount, where each first memory architecture drive includes a first memory architecture. In an implementation, each BGA mount is powered by an in-card power supply.

In an implementation, a method for transferring data includes a data transfer command received at a redundant array of independent drives (RAID) assist unit from a host processor via a local switch. A set of parallel memory transactions created between a local memory and a plurality of first memory architectures. The set of parallel memory transactions being executed via the local switch and absent interaction with the host processor. The host processor being notified upon completion of data transfer. In an implementation, the data transfer command is written into a submission queue in the RAID assist unit. In an implementation, an entry is written to a striper in the RAID assist unit to initiate creation of the set of parallel memory transactions. In an implementation, a completion queue is written into from the striper upon completion of the data transfer.

In general and without limiting implementations described herein, a computer readable non-transitory medium including instructions which when executed in a processing system cause the processing system to execute a method for transferring data directly from a second memory architecture associated with a GPU to a first memory architecture.

In general and without limiting implementations described herein, a computer readable non-transitory medium including instructions which when executed in a processing system cause the processing system to execute a method for distributively transferring data directly from a second memory architecture associated with a GPU to first memory architecture(s).

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for transferring data in a computer system comprising:
    receiving, at a redundant array of independent drives (RAID) assist unit, a data transfer command from a host processor via a switch;
    creating, by the RAID assist unit, a set of parallel memory transactions between a plurality of first memory architectures and a second memory architecture, wherein the RAID assist unit is connected to each of the plurality of first memory architecture units and the switch;
    segmenting and distributing, by the RAID assist unit, the set of parallel memory transactions amongst the plurality of first memory architecture units via the switch and absent interaction with the host processor; and
    notifying, by the RAID assist unit, the host processor upon completion of data transfer.

2. The method of claim 1, further comprising:
    writing the data transfer command into a submission queue in the RAID assist unit.

3. The method of claim 2, further comprising:
    writing an entry to a register in the RAID assist unit to initiate creation of the set of parallel memory transactions.

4. The method of claim 3, further comprising:
    writing a completion entry in a completion queue in the RAID assist unit upon completion of the data transfer.

5. The method of claim 1, wherein the plurality of first memory architectures is non-volatile memories (NVMs) and the second memory architecture is local memory.

6. A device comprising:
    a host processor;
    a plurality of first memory architectures;
    a switch;
    a redundant array of independent drives (RAID) assist unit; and
    a second memory architecture;
    wherein the host processor is configured to send a data transfer command to the RAID assist unit via the switch;
    wherein the RAID assist unit is configured to:
        create a set of parallel memory transactions between the plurality of first memory architectures and the second memory architecture, wherein the RAID assist unit is connected to each of the plurality of first memory architecture units and the switch;
        segment and distribute the set of parallel memory transactions amongst the plurality of the first memory architecture units via the switch and absent interaction with the host processor; and
        notify the host processor upon completion of data transfer.

7. The device of claim 6, wherein the host processor is further configured to write the data transfer command into a submission queue in the RAID assist unit.

8. The device of claim 7, wherein the host processor is further configured to write an entry to a register in the RAID assist unit to initiate creation of the set of parallel memory transactions.

9. The device of claim 8, wherein the RAID assist unit is further configured to write a completion entry in a completion queue in the RAID assist unit upon completion of the data transfer.

10. The device of claim 6, wherein the plurality of first memory architectures is non-volatile memories (NVMs) and the second memory architecture is local memory.

* * * * *